(12) United States Patent
Arlitt et al.

(10) Patent No.: US 9,062,650 B2
(45) Date of Patent: Jun. 23, 2015

(54) WELLS TURBINE HAVING PASSIVE ROTOR BLADE DISPLACEMENT

(75) Inventors: Raphael Arlitt, Ulm (DE); Helmut Bronowski, Heidenheim (DE); Jochen Weilepp, Heidenheim (DE); Michael Engelhardt, Heidenheim (DE); Ralf Starzmann, Sohnstetten (DE)

(73) Assignee: Voith Patent GmbH, Heidenheim (DE)

( * ) Notice: Subject to any disclaimer, the term of this patent is extended or adjusted under 35 U.S.C. 154(b) by 978 days.

(21) Appl. No.: 12/734,953

(22) PCT Filed: Oct. 16, 2008

(86) PCT No.: PCT/EP2008/008754
§ 371 (c)(1),
(2), (4) Date: Dec. 28, 2010

(87) PCT Pub. No.: WO2009/071150
PCT Pub. Date: Jun. 11, 2009

(65) Prior Publication Data
US 2011/0103958 A1  May 5, 2011

(30) Foreign Application Priority Data
Dec. 6, 2007 (DE) .......................... 10 2007 059 038

(51) Int. Cl.
*F03B 13/24* (2006.01)
*F03D 1/06* (2006.01)
*F03B 13/14* (2006.01)

(52) U.S. Cl.
CPC .............. *F03B 13/24* (2013.01); *F03D 1/0675* (2013.01); *F05B 2210/404* (2013.01);
(Continued)

(58) Field of Classification Search
CPC ............. F05B 2260/70; F05B 2260/74; F05B 2260/77; F05B 2260/78

USPC ............ 416/104, 108, 112, 117, 118, 132 B, 416/139, 144, 145, 153, 159, 232
See application file for complete search history.

(56) References Cited

U.S. PATENT DOCUMENTS 783,036 A * 2/1905 Gould ........................... 416/117
2,215,413 A * 9/1940 Weeks ............................ 416/52
(Continued)

FOREIGN PATENT DOCUMENTS

| CH | 660 770 A5 | 6/1987 |
|----|------------|--------|
| FR | 240 1329 | 3/1979 |

(Continued)

*Primary Examiner* — Nathaniel Wiehe
*Assistant Examiner* — Brian O Peters
(74) *Attorney, Agent, or Firm* — Farjami & Farjami LLP

(57) ABSTRACT

The invention concerns a Wells turbine, comprising a hub with a plurality of rotor blades having a drop-shaped profile orienting from a profile nose;

the rotor blades are attached to the hub in a rotary fashion by means of a foot part such that the rotor blade angle is variable with respect to the plane of rotation, wherein the associated rotational axis intersects the chord for each profile section in a threading point, which is located in a region between the profile nose and the aerodynamic center of the profile;

the adjustment of the blade angle is made passively by the equilibrium occurring during the operation of the wells turbine between the aerodynamic torque, acting on the rotor blades, and the centrifugal torque, wherein the average density of the rotor blade is selected to be less than 2700 kg/m$^3$ and/or the mass distribution within the profile is selected such that the surface centrifugal torque of the rotor blade is reduced relative to a profile made from a solid and/or the surface centrifugal torque of the rotor blades is at least partially balanced by compensatory weights, disposed at a distance from the rotational axis and perpendicular to the chord.

17 Claims, 2 Drawing Sheets

(52) U.S. Cl.
CPC ........ *F05B 2260/74* (2013.01); *F05B 2260/77* (2013.01); *F05B 2260/78* (2013.01); *F05B 2280/1021* (2013.01); *F05C 2201/021* (2013.01); *Y02E 10/32* (2013.01); *Y02E 10/38* (2013.01); *Y02E 10/721* (2013.01); *Y02E 60/17* (2013.01); *F03B 13/142* (2013.01)

(56) References Cited

U.S. PATENT DOCUMENTS

| | | | | |
|---|---|---|---|---|
| 4,048,947 | A | * | 9/1977 | Sicard .............................. 440/8 |
| 4,095,918 | A | * | 6/1978 | Mouton et al. .................... 415/7 |
| 4,971,641 | A | * | 11/1990 | Nelson et al. ................... 156/64 |
| 5,005,357 | A | * | 4/1991 | Fox ................................. 60/398 |
| 5,191,225 | A | * | 3/1993 | Wells ............................. 290/53 |
| 2005/0271508 | A1 | | 12/2005 | Beyene |

FOREIGN PATENT DOCUMENTS

| | | |
|---|---|---|
| GB | 1 595 700 | 8/1981 |
| GB | 2 250 321 A | 6/1992 |
| JP | 632 198 01 A | 9/1988 |

* cited by examiner

WELLS TURBINE HAVING PASSIVE ROTOR BLADE DISPLACEMENT

This is a U.S. national phase application which is based on, and claims priority from, PCT application Serial No. PCT/EP2008/008754, filed Oct. 16, 2008, which claims priority from foreign application Serial No. 102007059038.7, filed Dec. 6, 2007 in Germany.

The invention concerns a wells turbine with a passive rotor blade displacement, especially for use in a wave energy plant.

Wells turbines are known, wherein an exemplary reference is made to the U.S. Pat. No. 5,191,225 A. This document additionally discloses an OWC-power plant, using a double-stage wells turbine. An OWC-power plant produces energy from an oscillating water column (OWC). For this purpose a wave chamber having an opening, which is located below the water surface, is used. If a wave surges against the outer wall of the wave chamber, an inflow of seawater into the wave chamber occurs and as a result thereof, the water level at the inside rises. Accordingly, the water level falls with a retracting wave, wherein an oscillatory movement of the water column within the wave chamber in accordance with the frequency of the waves results. Above the water level within the wave chamber there is an encased mass of air being in communication with the surrounding atmosphere via a spatially limited ventilation channel. In accordance with the oscillating movement of the body of water within the wave chamber, the mass of air located above is subject to a pressure variation, wherein a constantly changing bidirectional stream of air with high velocity results to achieve pressure compensation within the ventilation channel, which is used to gain electrical energy.

In order to exploit a bidirectional flow, a turbine is used, keeping its sense of rotation for an incident flow coming from two different directions. Besides impulse turbines, the above-mentioned wells turbines have to be considered for this purpose. In that respect, wells turbines having rigidly attached rotor blades are known. These feature a symmetrical profile having a drop-shaped form to receive the bidirectional incident flow. One possible course of profile is the NACA 0012-profile. This profile defines a profile contour having a thickness of 12% related to the length of the chord. The chord of the profile and consequently the line of symmetry of the profile are arranged parallel to the plane of rotation of the turbine. Operating the wells turbine, there is an effective angle of attack against the profile of the respective turbine blade, which results from a vectorial adding of the rotational speed and the flow rate of the propulsive airstream. Typically, the angle of attack is small, such that the symmetrical profile functions as an airfoil and the forces acting on the aerodynamic center comprise a subcomponent in the tangential direction relative to the hub of the wells turbine, which serves for actuation. The further aerodynamic forces perpendicular to this tangential direction are counteracted by the bearings of the turbine.

Beside the difficulties of a high noise emission and the poor startup behavior, wells turbines suffer from the problem that with an increasing angle of attack, typically beyond 13°, a stall occurs at the turbine blades. Such a large angle of attack might occur in the course of a rapid increase of the flow rate due to a strongly varying airstream combined with an increase of the rotational speed of the wells turbine, which is not fast enough, or, alternatively, the wells turbine already runs at its nominal speed. Such conditions might especially occur for the above-described OWC-power plants, wherein for this field of application wells turbines have been developed, which provide a device for adjusting the blade angle of the rotor blades. In the following, the term "blade angle" is understood as the angle between the chord of the rotor blade and the blade of rotation of the wells turbine.

The afore-mentioned rotor blade displacement can be achieved by an active guidance, wherein the rotor blades are pivot-mounted on the hub of the wells turbine and an actuation equipment is used, which positions the rotor blades with respect to the angle of attack in correspondence with the present rotational speed and the respective incident flow conditions. Correspondingly, there is an additional necessity to use means for control. These typically do not only have the object of adjusting the rotor blade displacement to prohibit a stall, but also the rotor blade displacement is beneficially applied such that the optimal degree of efficiency is achieved for the present flow coefficient. It is known that for higher flow coefficients, there is an increase of efficiency due to a displacement of the rotor blades with a blade angle of several degrees. For the typical operation of a wells turbine of an OWC-power plant, it is advantageous to have the ability to achieve a rotor blade displacement in the order of magnitude of at least 6°. For reasons of efficiency, it is preferred to have even higher blade angles of at least 8° and more. Furthermore, an active rotor blade displacement might assist the startup of a wells turbine, which usually is conducted as a motor driven operation of the electrical generator.

The US 2005/0271508 A1 discloses a turbine with flexible rotor blades. The goal is to increase the degree of efficiency. As a solution it is proposed to use rotor blades having rigid as well as flexible portions.

The disadvantage of an active device for the adjustment of the blade angle of the rotor blades is the constructional effort, which is necessary for the actuation device and the controller. To circumvent this difficulty, a passive rotor blade displacement has been proposed, in that respect reference is made to the JP 63219801 A. This document discloses pivot-mounted rotor blades on a hub of a wells turbine, which can oscillate between two blade angle settings, being determined by two body stops. This arrangement improves the self startup capability of a wells turbine in case of the occurrence of a stall. However, the so far known passive rotor blade displacement devices do not allow during the normal operation to achieve such a sufficiently high blade angle of the rotor blades that the efficiency coefficient is optimized in dependence on the flow coefficient of the incidence flow and the rotational speed.

It is an object of the invention to further develop a passive rotor blade displacement of a wells turbine such that the degree of efficiency is improved, especially for a high flow coefficient, and that an operation at low nominal speeds can be conducted. Additionally, the device should be suitable to increase the operating range of the wells turbine, which means that the range of accessible angles of attack without the occurrence of a stall should be increased. Furthermore, the device should allow a simplification of the design and the manufacturing.

The object of the invention is solved by the features of the independent claim.

In order to develop a passive rotor blade displacement, the inventors have discovered, that on the one hand the rotational axis of the rotor blades have to be set in suitable relation to the aerodynamic center. On the other hand, the centrifugal force torque, forcing the rotor blades back to the plane of rotation, has to be at least partly balanced in order that the equilibrium between the aerodynamic torque and the centrifugal torque leads to a blade angle setting, which provides a sufficiently large relative angle between the plane of symmetry of the rotor blades and the plane of rotation. In detail the following inventive measures are taken:

The aerodynamic forces acting on the rotor blades lead to an aerodynamic pitch torque which, however, could be neglected due to the small angle of attack. Consequently, the main component of the aerodynamic forces, which is responsible for the turning motion of the rotor blades, leading to the wanted deviation from the plane of rotation, is a result of the vectorial addition of the flow resistance and the lift on the symmetrical profile, functioning as airfoil. If the rotational axis of the rotor blade is arranged such that for each profile section the threading point, marking the point where the rotational axis intersects with the chord, is arranged between the profile nose and the aerodynamic center of the profile, a torque around the threading point results, which increases with a reduced distance thereof towards the profile nose. Consequently, there is a first requirement regarding the arrangement of the rotational axis. Accordingly, the rotational axis has to be arranged between the profile nose and the aerodynamic center of the profile, typically in the vicinity of $c_b/4$, wherein $c_b$ represents the length of the chord.

Additionally, a centrifugal force torques acts on the rotating rotor blades, wherein for a pivot arranged, as described above, in the upstream part of the profile section, typically a torque results, which leads the pivotable rotor blade back to the plane of rotation, thereby minimizing the surface centrifugal torque. Rotor blades in accordance with the state of the art, made from a solid piece of aluminum, lead, for typical operation conditions for a wells turbine of an OWC-power plant, to a torque equilibrium between the aerodynamic torque and the centrifugal torque on the rotor blade, resulting in an angle of attack in the order of ≤0,5°. Such a small angle is not sufficient to increase the efficiency and to extend the operational range of a wells turbine.

The inventors have discovered that for a passive rotor blade displacement for wells turbines additional measures have to be taken, which reduce or balance the centrifugal force torque leading the rotor blades back to the plane of rotation. In the following, different measures in accordance with the invention are proposed, which achieve this goal as single measure or in combination with the other ones.

One measure refers to the reduction of the inertia of the rotor blades especially in those parts, which are distanced from the rotational axis along the chord. To achieve this object, it is preferred to construct the rotor blades not from a solid piece of aluminum, having a density of 2700 kg/m³, but to use a material having a reduced weight or, respectively, to apply a profile, which is in part hollow instead of using a solid piece. This could be realized by a fiber enhanced composite material, especially a composite comprising glass fibers or carbon fibers.

To compare the inventive rotor blades with blades having a conventional design, the present application uses the term of an "averaged density" of the rotor blades. This has to be understood as the density averaged over a profile section in order to compare a rotor blade made from a composite material, which comprises cavities, with a rotor blade made in accordance with the state of the art from a solid, typically of an aluminum solid. It is especially preferred to have an average density of the rotor blades, which is smaller than the corresponding value for solid aluminum of 2700 kg/m³.

For a further inventive measure, the mass distribution within a given profile is adapted such that the surface centrifugal torque is reduced. For this purpose, the mass distribution along the chord shows a local concentration around the rotational axis. Therefore, those parts, which are distanced from the rotational axis in the direction of the chord, are realized as light-weight structures. Correspondingly, upstream and/or downstream portions of the rotor blade are made from a material of reduced density or contain cavities. For the afore-mentioned arrangement of the threading point on the chord in-between the profile nose and the aerodynamic center of the profile, it is advantageous to arrange a cavity in the downstream portion of the profile, since in this portion the distance to the rotational axis, which influences the calculation of the surface centrifugal torque as a quadratic value, is especially large.

For the third inventive measure the surface centrifugal torque of the rotor blades is reduced by counter balancing centrifugal forces. This is achieved by a spreading of the mass distribution in the vicinity of the rotational axis in transverse direction with respect to the chord. Alternatively or as an additional measure, compensatory weights are used, arranged outside of the part of the rotor blade, touched by the airflow, and being rigidly attached to the rotor blade. According to a preferred embodiment, the compensatory weights are arranged in a foot part of the rotor blade and are located within the hub of the wells turbine. Accordingly, the compensatory weights could be realized by the design and/or the selection of the material of the foot part. For a different preferred embodiment separate compensatory weights, for example lead balls, are used, having a distance $r_A$ to the pivot perpendicular to the chord. Such weights are arranged pair-wise, i.e. they are arranged symmetrically with respect to the chord.

In the following, the invention, is described with respect to specific embodiments in connection with figures, which show the following:

Figure 2:
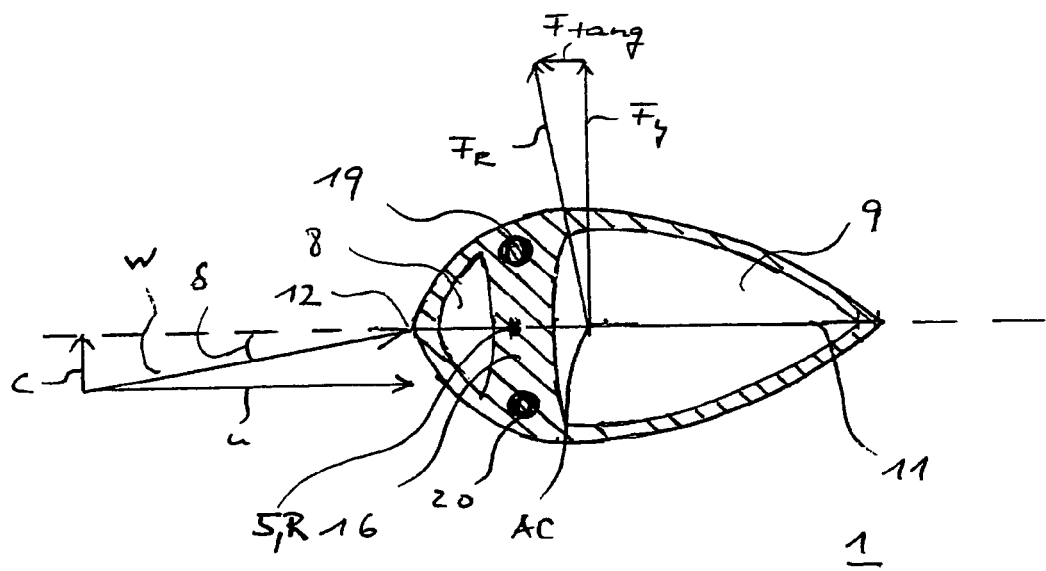
FIG. 2 shows the section A-A from FIG. 1.

The sketch of FIG. 2 shows the incident flow conditions for a rotating wells turbine with the help of a section of the rotor blade 1. Depicted is the vectorial addition of the velocity of the airflow c and the negative rotational velocity u of the rotor blade 1 and the resulting effective incident flow w and the corresponding effective angle of the incident flow δ, having a small magnitude, which is characteristic for a wells turbine.

The symmetric profile functions as airfoil and produces an aerodynamic force $F_R$, acting on the aerodynamic center AC, which is typically situated at a quarter of the length of the chord 11. This aerodynamic force $F_R$ can be vectorially divided to form a tangential force component $F_{tang}$ and a transverse force component $F_y$, wherein the tangential force component $F_{tang}$ is used for propulsion and the transverse force component $F_y$ is counteracted by the bearings of the wells turbine in case of rigidly attached rotor blades.

Presently, a passive rotor blade displacement is used. This comprises in accordance with a preferred embodiment a foot part 3, which is typically of circular shape and which is located radial inward of the rotor blade 1 and which is received by a recess 13 within the hub 12, being formed as a counter piece thereto. The foot part 3 preferably comprises a center pin 4, which determines the rotational axis 5 of the rotor blade 1 and which additionally and preferably functions as radial fastening.

Figure 1:
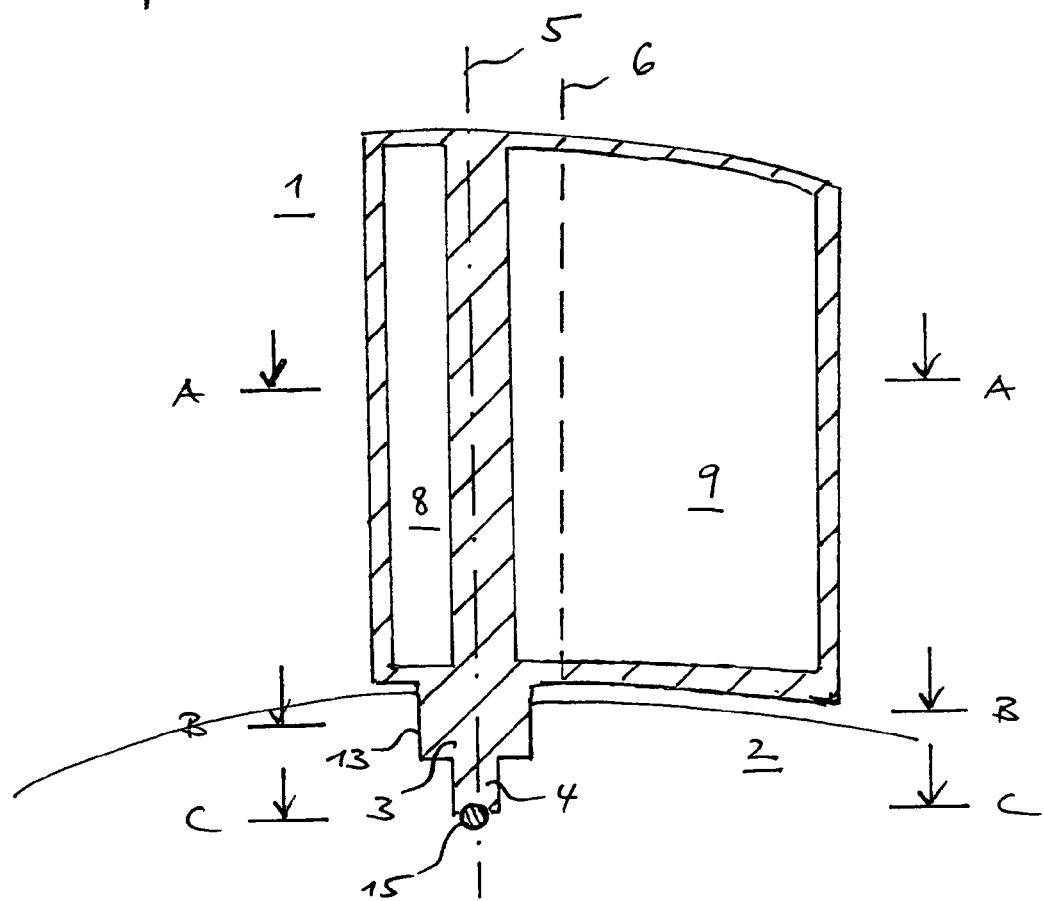
FIG. 1 shows a sectional view of a rotor blade of an inventive wells turbine with respect to the plane of rotation.

In accordance with FIG. 1, the rotational axis 5 is located upstream of the course of the location of the aerodynamic center 6. This again is evident from the sectional view of FIG. 2. What is shown is an arrangement of the intersection point between the rotational axis 5 and the chord 11 at a point, which in the following is addressed as threading point R. This threading point R is located as close as possible to the profile nose 12 and upstream of the aerodynamic center AC, in order to produce a torque around the rotational axis 5, which forces the rotor blade 1 to leave the plane of rotation 21.

A surface centrifugal force torque, which acts against the aerodynamic torque, results from the elongated profile in case of a deviation of the rotor blade from the plane of rotation 21, such that in accordance with an inventive feature the mass distribution within the profile is adjusted while keeping its outer contour in order to achieve a concentration of the inertia around the threading point R with respect to the length-wise direction, which is defined by the chord 11. Additionally, it is preferred to spread the mass distribution in the vicinity of the rotational axis 5 in transverse direction with respect to the chord 11. An embodiment of such a mass distribution within the rotor blade 1 is shown in the FIGS. 1 and 2.

What is depicted is the use of a hollow profile instead of a solid profile, which would be in accordance with the state of the art. The sketch shows a rotor blade 1 having a cavity on the upstream side 8, located ahead of the rotational axis 5, and a cavity on the downstream side 9, located rearward of the rotational axis 5. In order to realize such a hollow profile, it is possible to use composite materials containing fiber glass or carbon fibers. Said measure leads to a reduced inertia of the rotor blade 1 and to a general reduction of the surface centrifugal torque. On the other hand, the preferred mass distribution along the chord 11 and an enhanced spreading of the mass in the vicinity of the rotational axis 5 in transverse direction to the chord 11 is achieved. The later is achieved by using a stop ridge 16 within the profile, containing the rotational axis 5 and which is bulky in areas being distanced in transversal direction with respect to the pivot. The stop ridge 16 essentially has a perpendicular orientation with respect to the chord 11. As a consequence a dumbbell-shaped mass distribution perpendicular to the chord 11 with the rotational axis 5 as center is achieved, which in case of a non-vanishing blade angle α of the rotor blade 1, leads to a blade angle enhancing contribution to the torque, produced by the centrifugal force, when the rotor blade rotates.

Said contribution could be enhanced by the application of a first rear weight 19 and a symmetrically arranged second rear weight 20, being made form a material with a high density, such as lead, and being located at the outer portions of the stop ridge 16.

In order to compare the inventive mass distribution of the profile with the one for a profile made from a solid piece, the present application introduces the term of a "density, averaged in transverse direction, viewed along the chord". This refers to a respective averaging of the mass density perpendicular to the chord 11. Along the chord 11 the magnitudes thereof is reduced, if cavities or materials for light weight construction are applied at least in a part of the transverse extension perpendicular to the chord 11. To generalize, the inventive measure concerns the reduction of the density averaged in transverse direction in areas, which are distanced in length-wise direction, i.e. parallel to the chord 11, from the rotational axis 5. In doing so, it is especially effective to reduce the averaged density, view along the chord 11 at the upstream and downstream ends of the profile. Instead of using cavities, it is also possible to combine light weighted material, such as a foaming in pack, with materials assuring the structural capability. Furthermore, it is possible to apply a strutting for stiffening cavities.

The above-described inventive measures, concerning the mass distribution within the profile of the rotor blades 1, are typically limited by the requirements, assuring the structural capability and the bending strength, wherein in many cases a complete balancing of the surface centrifugal torque, which forces the rotor blade 5 back to the plane of rotation 21, is not possible. Accordingly, as a further inventive measure, which could be an alternative or an additional measure to realize the invention, rear weights are connected to the foot part 3 of the rotor blade 1, further balancing the surface centrifugal torque of the rotor blade 1.

Figure 3:
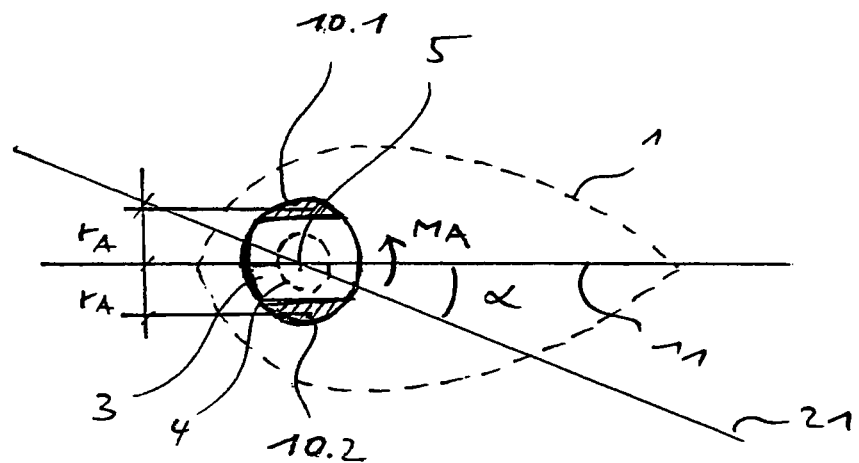
FIG. 3 shows the section B-B from FIG. 1 of the foot part of an inventive rotor blade.

The sectional view of FIG. 3 shows the cross section along the line B-B of FIG. 1, seen from the top direction for such an inventive embodiment. Depicted is a circular shaped contour of the foot part 3. For better understanding, parts of the rotor blade 1, located above or below the section B-B are shown as dashed lines. This refers to the upper part of the rotor blade 1, which form the surfaces touched by the airflow, and the center pin 4, following up the foot part 3 in the radial inward direction.

FIG. 3 shows as inventive measure a pair-wise arrangement of a first compensating weight 10.1 and a second compensating weight 10.2, both being arranged at a distance $r_A$ to the rotational axis 5. Correspondingly, there is a perpendicular arrangement of the compensatory weights 10.1, 10.2 with respect to the chord 11. For this reason, there is a blade angle enhancing centrifugal force torque $M_A$, which acts against the surface centrifugal torque, when the rotor blade 1 rotates and in case of a non-vanishing blade angle. For an especially preferred case the compensatory weights form an inertia, embedded in the composite structure of the foot part 3. The compensatory weight should have a high density, which is for example achieved by using bodies made of lead. Furthermore, it is preferred to choose such an arrangement and such a dimensioning of the compensatory weights 10.1, 10.2 that the blade angle enhancing centrifugal force torque $M_A$ is set such that the surface centrifugal force torque is at least compensated by 85%. Even more preferred is a further compensation of at least 90% and especially preferred of at least 95%.

Figure 4:
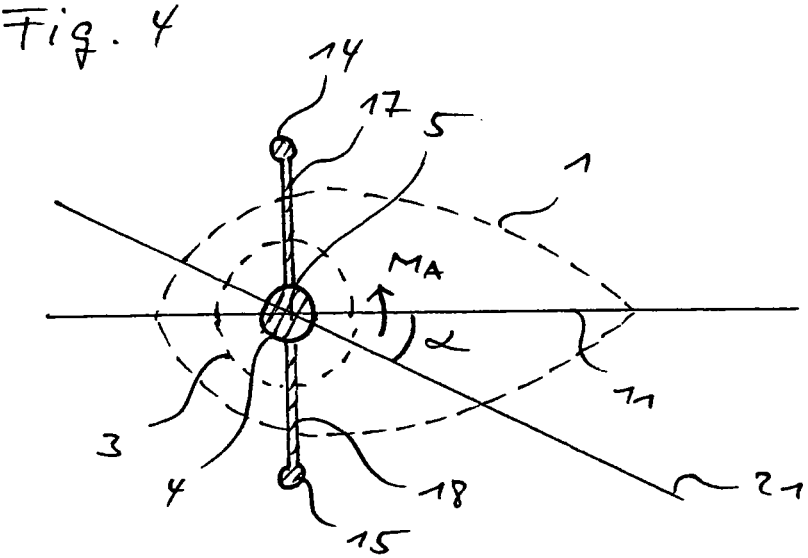
FIG. 4 shows the section C-C from FIG. 1 for an embodiment of the inventive rotor blades with compensatory weights, arranged within the hub.

FIG. 4 shows a further alternative embodiment with balance weights. Shown is a top view on the sectional plane C-C of FIG. 1, depicting the use of a first separate compensatory weight 14 and a second separate compensatory weight 15. These might be realized as lead balls, which are attached by a first strut 17 and a second strut 18 at the center pin 4. Accordingly, the separate compensatory weights 14, 15 are preferably arranged within a recess in the hub 2.

The inventive measures are used to achieve a passive rotor blade displacement for a wells turbine, which allows a blade angle setting of at least 5° for a high flow coefficient and in case that the nominal speed is achieved. More preferred is a higher magnitude of the blade angle, which further increases the degree of efficiency. This is achieved by preferably substantially compensating the sum of the centrifugal force torque components acting on the rotor blade 1. If this is substantially achieved, the wells turbine is provided with body stops, which limit the blade angle, resulting from the action of the aerodynamic torque.

LIST OF REFERENCE NUMERALS 1 rotor blade
2 hub
3 foot part
4 center pin
5 rotational axis
6 course of the location of the aerodynamic center
8 cavity on the upstream side
9 cavity on the downstream side
10.1 first compensatory weight
10.2 second compensatory weight 11 chord
12 profile nose
13 recess
14 first separate compensatory weight
15 second separate compensatory weight
16 stop ridge
17 first strut
18 second strut
19 first rear weight
20 second rear weight
21 plane of rotation
α blade angle
δ effective angle of the incident flow
AC aerodynamic center
c velocity of the airflow
$F_R$ aerodynamic force
$F_{tang}$ tangential force component
$F_y$ transverse force component
$M_A$ blade angle enhancing centrifugal force torque
$r_A$ distance to the pivot in perpendicular direction
R threading point
S center of gravity
u negative rotational velocity
w effective incident flow vector

The invention claimed is:

1. A wells turbine for exploiting a bidirectional flow, the wells turbine comprising:
a hub; and
a plurality of rotor blades attached to the hub in a rotary fashion using a foot part such that a rotor blade angle is freely variable with respect to a plane of rotation, wherein an associated rotational axis intersects a chord for each profile section in a threading point, wherein the threading point is located in a region between a profile nose and an aerodynamic center of a profile;
wherein the profile of the rotor blades is a drop-shaped profile oriented from the profile nose, wherein the drop-shaped profile is an airfoil producing lift and drag;
wherein the wells turbine is set to rotate during operation such that an adjustment of the rotor blade angle is made passively by an equilibrium occurring between an aerodynamic torque and a centrifugal torque acting on the rotor blade, wherein the rotor blade has at least an average density less than 2700 kg/m3, a mass distribution within the profile wherein the surface centrifugal torque of the rotor blade is reduced compared to a profile made of solid material, and a surface centrifugal torque of the rotor blades that is at least partially balanced by compensatory weights, wherein each of the compensatory weights has a center of mass disposed at a distance from the rotational axis in a traverse direction with respect to the chord, wherein the distance from the rotational axis is larger in a perpendicular direction with respect to the chord than in a parallel direction with respect to the chord, wherein the compensatory weights are arranged within or on the foot part in a pair-wise manner to both sides of the chord.

2. The wells turbine in accordance with claim 1, wherein the rotor blades are designed at least in part as a hollow profile.

3. The wells turbine in accordance with claim 2, wherein the hollow profile is at least in part filled by a material having a density which is lower than the density of the material used for the wall of the hollow profile.

4. The wells turbine in accordance with claim 2, wherein the rotor blades are made from a composite material comprising at least one of carbon fibers and fiber glass.

5. The wells turbine in accordance with claim 2, wherein the rotor blade comprises a cavity on the upstream side, being disposed ahead of at least one of the rotational axis and a cavity on the downstream side, disposed rearward of the rotational axis.

6. The wells turbine in accordance with claim 2, wherein the compensatory weights are integrated by at least one of the design and material selection of the foot part.

7. The wells turbine in accordance with claim 2, wherein the foot part is a composite part into which weights are embedded to create the compensatory weights.

8. The wells turbine in accordance with claim 2, wherein separate compensatory weights are arranged within the hub of the wells turbine and are attached to the foot part.

9. The wells turbine in accordance with claim 2, wherein weights are arranged within the profile contour of the rotor blade perpendicularly with respect to the chord and with a transverse distance to the rotational axis.

10. The wells turbine in accordance with claim 2, wherein a stop ridge with a dumbbell-shaped mass distribution, extending perpendicularly to the chord, is arranged in the vicinity of the rotational axis.

11. The wells turbine in accordance with claim 1, wherein the rotor blades are made from a composite material comprising at least one of carbon fibers and fiber glass.

12. The wells turbine in accordance with claim 1, wherein the rotor blade comprises a cavity on the upstream side, being disposed ahead of at least one of the rotational axis and a cavity on the downstream side, disposed rearward of the rotational axis.

13. The wells turbine in accordance with claim 1, wherein the compensatory weights are integrated by at least one of the design and material selection of the foot part.

14. The wells turbine in accordance with claim 1, wherein the foot part is a composite part into which weights are embedded to create the compensatory weights.

15. The wells turbine in accordance with claim 1, wherein separate compensatory weights are arranged within the hub of the wells turbine and are attached to the foot part.

16. The wells turbine in accordance with claim 1, wherein weights are arranged within a profile contour of the rotor blade perpendicularly with respect to the chord and with a transverse distance to the rotational axis.

17. The wells turbine in accordance with claim 1, wherein a stop ridge with a dumbbell-shaped mass distribution, extending perpendicularly to the chord, is arranged in the vicinity of the rotational axis.

* * * * *